United States Patent
Hamaguchi

(10) Patent No.: US 8,986,143 B2
(45) Date of Patent: Mar. 24, 2015

(54) CHAIN TRANSMISSION DEVICE

(71) Applicant: Tsubakimoto Chain Co., Osaka (JP)

(72) Inventor: Shuuji Hamaguchi, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 255 days.

(21) Appl. No.: 13/783,736

(22) Filed: Mar. 4, 2013

(65) Prior Publication Data

US 2013/0244821 A1 Sep. 19, 2013

(30) Foreign Application Priority Data

Mar. 13, 2012 (JP) .................. 2012-056272

(51) Int. Cl.
*F16H 7/06* (2006.01)
*F16G 13/04* (2006.01)
*F16G 13/08* (2006.01)

(52) U.S. Cl.
CPC ...... *F16H 7/06* (2013.01); *F16G 13/04* (2013.01); *F16G 13/08* (2013.01)
USPC .......................................................... 474/148

(58) Field of Classification Search
CPC ............ F16H 7/06; F16G 13/04; F16G 13/08
USPC ................................. 474/200–267
See application file for complete search history.

(56) References Cited

U.S. PATENT DOCUMENTS

| 6,383,105 B1* | 5/2002 | Matsuno et al. ............. 474/213 |
| 2004/0166978 A1 | 8/2004 | Matsuda et al. |
| 2007/0072719 A1 | 3/2007 | Sakamoto |
| 2011/0009221 A1* | 1/2011 | Ogo ............................ 474/213 |
| 2012/0165144 A1* | 6/2012 | Dogimont et al. ............ 474/212 |

FOREIGN PATENT DOCUMENTS

| JP | 2002-349675 A | 12/2002 |
| JP | 2007-92850 A | 4/2007 |

* cited by examiner

*Primary Examiner* — William E Dondero
*Assistant Examiner* — Robert T Reese
(74) *Attorney, Agent, or Firm* — Howson & Howson LLP

(57) ABSTRACT

In a transmission chain, guide plates are provided on opposite ends of guide rows. In a guide row, both of the guide plates can be contact guide plates arranged to contact sides of the transmission sprocket teeth. However, some of the guide rows are formed with one guide plate configured for contact with the sprocket teeth and the opposite guide plate configured so that it does not contact the sprocket teeth. The sprocket tooth-contacting plates can be on one side of the chain in some of the guide rows and on the opposite side of the chain in other guide rows. The guide plates in still other guide rows are configured so that they never contact the sides of the sprockets.

12 Claims, 6 Drawing Sheets

CHAIN TRANSMISSION DEVICE

CROSS REFERENCE TO RELATED APPLICATIONS

The disclosure of Japanese Patent Application No. 2012-056272 filed on Mar. 13, 2012, and on which this application claims priority, is herein incorporated by reference in its entirety.

FIELD OF THE INVENTION

This invention relates to a chain transmission device including an endless, flexible, transmission chain in mesh with a set of sprockets, the chain having alternating, interconnected, guide rows and link rows, each guide row having guide plates.

The chain can be a silent chain or any of various other kinds of transmission chains. The chain transmission device can be used as a timing chain in an automobile engine, or as a power transmission chain in a vehicle or in other kinds of machines such as industrial machinery.

BACKGROUND OF THE INVENTION

A conventional chain transmission device includes an endless chain in which a plurality of guide rows and a plurality of link rows are arranged alternately in the longitudinal direction of the chain and connected to one another flexibly. Each of the guide rows has a pair of guide plates and one or more link plates arranged between the pair of guide plates in the widthwise direction of the chain. Each of the link rows has a plurality of second link plates. The transmission includes a plurality of sprockets around which the chain is wrapped. An example of such a transmission is described in United States Patent publication 2004/0166978, published on Aug. 26, 2004.

As shown in FIGS. 11 and 12, a chain transmission 500 includes a chain 530 which has a wrapping portion 531 wrapped around and engaging with a sprocket 510 of a sprocket set. A pair of guide plates 540 of a guide row G5 of the chain 530 guide first and second link plates 560 and 570 along the longitudinal direction of the chain. In the wrapping portion 531, the pair of guide plates 540 may come into contact with side surfaces 512 of the sprocket 510 to restrict sideslip, i.e., movement of the chain 530 in the widthwise direction.

Noise is generated when the guide plates 540 come into contact with the sprocket side surfaces 512. In addition, power transmission efficiency is impaired by friction between the guide plates 540 and the sprocket side surfaces 512.

Furthermore, when a plurality of the guide rows G5 are regularly arranged in a chain longitudinal direction, the guide plates 540 come into contact with the sprocket side surfaces 512 at regular intervals, causing generation of periodic sounds.

This invention addresses the above problems. It is an object of the invention to provide a chain transmission in which some of guide rows of a chain have non-contact guide plates which do not come into contact with side surfaces of the sprockets in order to decrease noise and friction caused by contact between guide plates of the guide rows and the side surfaces of the sprockets, and to reduce the weight of the chain.

SUMMARY OF THE INVENTION

The chain transmission according to the invention comprises a chain and a plurality of sprockets, at least one of the sprockets being in driving relationship with the chain, and at least one of the sprockets being in driven relationship with the chain. The chain is elongated in a lengthwise direction and has a width in a widthwise direction perpendicular to the lengthwise direction. The chain comprises a plurality of guide rows and a plurality of link rows, the guide rows and link rows being arranged alternately along the lengthwise direction of the chain and flexibly interconnected to one another. Each of the guide rows has a pair of guide plates spaced from each other in the widthwise direction and at least one first link plate disposed between the pair of guide plates. Each of the link rows has a plurality of second link plates. At any time during the operation of the transmission, the chain has a plurality of wrapping portions, a wrapping portions being in engagement with, and extending around, a portion of each of the sprockets. Each of guide plates of each of the guide rows is a guide plate from the group consisting of contact guide plates, which are able to come into contact with side surfaces of the sprockets when in a wrapping portion of the chain, and non-contact guide plates, which do not come into contact with sprocket side surfaces when in the wrapping portion of the chain. The guide rows of the chain include at least one contact guide row having at least one contact guide plate, and at least one non-contact guide row having only non-contact guide plates.

The contact guide plates of the contact guide rows restrict sideslip of the chain. However, because some of the guide rows of the chain are non-contact guide rows having only non-contact guide plates, the number of the guide rows that come into contact with side surfaces of the sprockets and the sprocket teeth is reduced. Consequently, noise and friction caused by the contact between guide plates and the sprocket side surfaces are reduced, and power transmission can take place more efficiently. In addition, because the non-contact guide plates are lighter in weight than the contact guide plates, impact noise generated when the contact guide plates come into contact with the sprocket side surfaces is reduced. The weight of the chain is also reduced, and therefore the overall weight of the machinery of which the chain is a part is reduced.

According to a second aspect of the invention, at least one of the wrapping portions of the chain always includes at least one contact guide row having at least one contact guide plate, and a plurality of non-contact guide rows each having only non-contact guide plates. Here, because at least one of the wrapping portions always includes a contact guide row, it is possible to restrict sideslip of the chain. Because at least one of the wrapping portions always includes a plurality of the non-contact guide rows, the weight of the wrapping portions is reduced, and impact noise and friction loss are reduced.

According to a third aspect of the invention, in each of the wrapping portions, the number of non-contact guide rows is always greater than the number of contact guide rows. Here, because the wrapping portions always include a larger number of non-contact guide rows than contact guide rows, the weight of the wrapping portions is still further reduced. Thus, it is possible to realize a further decrease in impact noise and friction.

According to a fourth aspect of the invention, the pair of guide plates of each of the guide rows consists of a first and second guide plates opposed to each other in the widthwise direction and provided on opposite sides of the chain. The contact guide rows of the chain comprise at least one first contact guide row, the first and second guide plates of which are contact guide plates, and a plurality of second contact guide rows one of the first and second guide plates of which is a contact guide plate and the other of the first and second guide plates of which is a non-contact guide plate. The plurality of second contact guide rows consists of guide rows from the group consisting of type 1 contact guide rows the first and second guide plates of which are respectively contact guide plates and non-contact guide plates and type 2 contact guide rows the first and second guide plates of which are respectively non-contact guide plate and contact guide plates.

At least one of the wrapping portions always includes at least one guide row from the group consisting of: (a) at least one first contact guide row, (b) at least one first contact guide rows and at least one second contact guide row; and (b) at least one said type 1 contact guide row and at least one said type 2 contact guide rows.

With this configuration the chain is restricted against chain sideslip bidirectionally.

According to a fifth aspect of the invention, the pair of guide plates of each of the guide rows consists of a first and second guide plates opposed to each other in the widthwise direction and provided on opposite sides of the chain. Each of the contact guide rows is a guide row from the group consisting of a type 1 contact guide row the first and second guide plates of which are respectively a contact guide plate and a non-contact guide plate, and a type 2 contact guide row the first and second guide plates of which are respectively a non-contact guide plate and a contact guide plate, and at least one of the wrapping portions always includes at least one type 1 contact guide row and at least one type 2 contact guide row.

Here, because at least one of the wrapping portions always includes at least one type 1 contact guide row and at least one type 2 contact guide row, it is possible to restrict sideslip of the chain bidirectionally.

According to a sixth aspect of the invention, each of guide plates of each contact guide row is a contact guide plate. Here again, because each of guide plates of the contact guide row is a contact guide plate, it is possible to restrict sideslip bidirectionally in the wrapping portion.

According to a seventh aspect of the invention, one of the pair of guide plates of at least one of the contact guide rows is a contact guide plate and the other guide plate of the pair is a non-contact guide plate. Here it is possible not only to restrict sideslip of the chain, but also to reduce the weight of the wrapping portions, and to decrease impact noise and friction.

According to an eighth aspect of the invention, a plurality of the contact guide rows are arranged randomly in the lengthwise direction of the chain. Here, because contact between the guide plates and the sprocket side surfaces does not occur at regular intervals, periodic contact noise is decreased.

DETAILED DESCRIPTION OF THE PREFERRED EMBODIMENT

In the following description, the term "guide plate" should be understood as referring to a plate in the position of a guide plate, whether or not it Is capable of coming into contact with the side of a sprocket. The invention can be embodied in any chain transmission comprising a chain and a plurality of sprockets, at least one of the sprockets being in driving relationship with the chain, and at least one of the sprockets being in driven relationship with the chain. For example, the chain may be a silent chain or any chain having link plates corresponding to a pair of guide plates.

The chain transmission can be utilized not only in an automobile engine, but also in industrial machinery, conveying or carrying machines, and other machines that utilize a chain for transmission of power. While a typical chain transmission has one driven sprocket and one driving sprocket, the chain transmission can have more than one driven sprocket and can have more than one driving sprocket. The driving sprocket or sprockets can be operated by an internal combustion engine, an electric motor, or any of various other kinds of power generating devices for rotating a sprocket.

Figure 1:
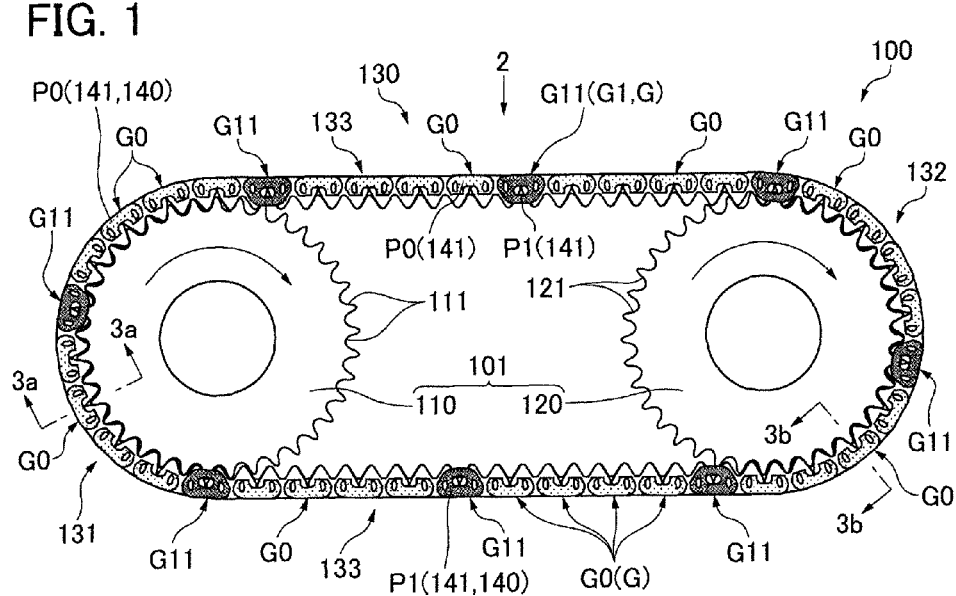
FIG. 1 is an elevational view illustrating a chain transmission device in accordance with a first embodiment of the invention.
Figure 2:
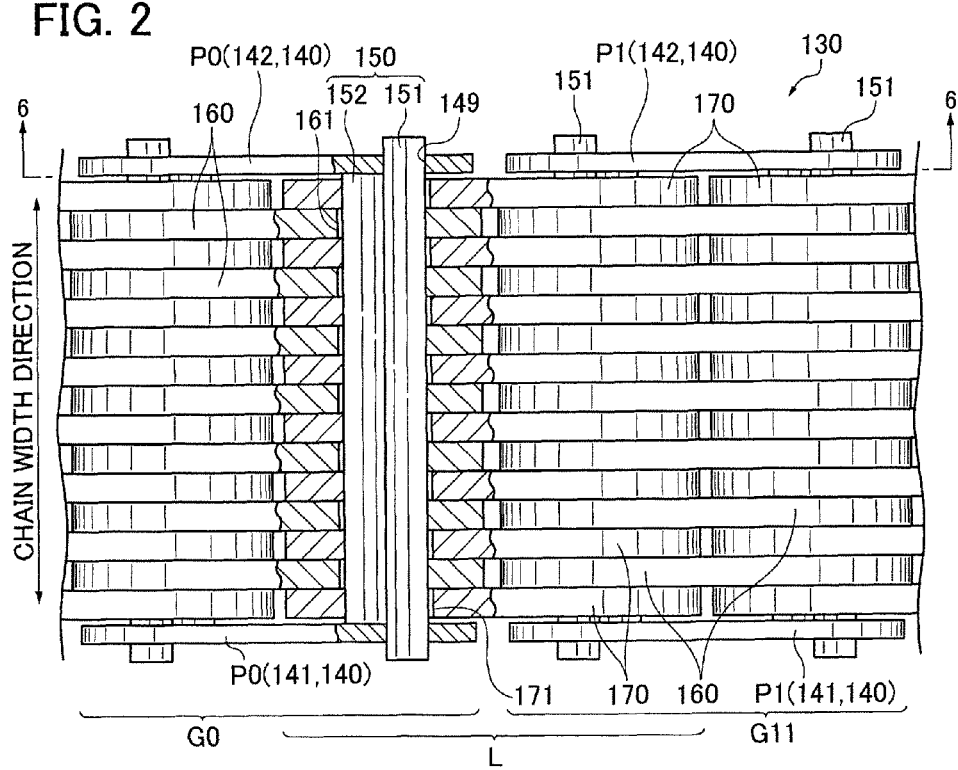
FIG. 2 is an enlarged view, partly in section, of a part of the chain in the transmission of FIG. 1, as viewed in the direction of arrow 2 in FIG. 1.
Figure 4:
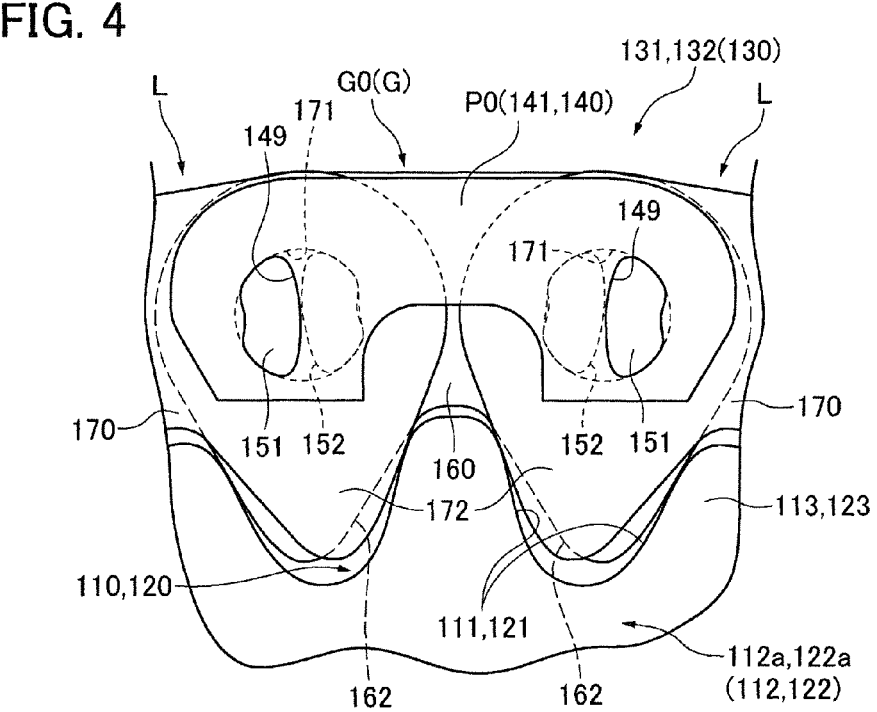
FIG. 4 is an elevational view of a part of the chain of FIG. 3, as viewed in the direction of arrow 4 in FIG. 3.

The transmission device 100 shown in FIG. 1, which can be a timing drive in an automobile engine (not shown), comprises an endless silent chain 130. Referring to FIGS. 1, 2 and 4, the chain transmission 100 also has a sprocket set 101 in mesh with the chain. The sprocket set 101 includes a driving sprocket 110 and a driven sprocket 120. The driving sprocket 110 is rotated by the crank shaft of an engine, and the driven sprocket 120 rotates a valve-operating camshaft in the engine or the drive shaft of an engine accessory such as an oil pump. The sprockets 110 and 120 respectively have sprocket teeth 111 and 121 which are capable of meshing engagement with the chain 130.

Referring to FIGS. 1 to 4, the chain 130 includes a plurality of guide rows G, a plurality of link rows L, and a plurality of connecting pins 150 (FIG. 2), which connect the guide rows G with the link rows L. The guide rows G are arranged alternately with the link rows L and the connecting pins allow relative articulation of the guide rows and link rows.

Each of the guide rows G includes a pair of guide plates 140, and one or more first link plates 160 disposed between the pair of guide plates. In the chain shown in FIGS. 2 and 3, each guide row includes a plurality of first link plates 160. Each first link plate 160 has a pair of pin holes 161 spaced from each other in the longitudinal direction of the chain, and a pair of teeth 162 (FIG. 4) capable of engaging with the sprocket teeth.

Each of the link rows L includes a plurality of second link plates 170, which are arranged in spaced, side-by-side relationship in the widthwise direction of the chain. The number of second link plates in each link row L exceeds by one the number of first link plates 160 in each guide row G. The second link plates 170 in each of the link rows L extend into a space between a pair of guide plates 140 of a first adjacent guide row and into a space between a pair of link plates in another adjacent guide row. Each second link plate has a pair of second pin holes 171, spaced from each other in the longitudinal direction of the chain, and a pair of teeth 172 capable of engaging the sprocket teeth 111 and 121.

Each of the connecting pins 150 is a rocker joint pin composed of a first pin 151 and a second pin 152, which is shorter than the first pin 151. The first and second pins 151 and 152 are inserted together through the first and second pin holes 161 and 171 and extend through the first and second link plates 160 and 170 in the widthwise direction of the chain.

Each of the guide plates 140 of a guide row G has a pair of pin-holding holes 149, spaced from each other in the longitudinal direction of the chain, for holding the first pins 151. By insertion into the pin-holding holes, each first pin 151 is fixed to the guide plates 140 at both ends thereof. Although the connecting pins in the embodiment illustrated are rocker joint pins, as an alternative, each of the connecting pins can be a single cylindrical pin.

As shown in FIG. 1, the chain 130 includes wrapping portions 131 and 132 which respectively extend in arcs around parts of sprockets 110 and 120, and engage the sprocket teeth 111 and 121. The portions of the chain that are not wrapped around the sprockets are free span portions 133 that extend from one sprocket to the other.

Referring to FIG. 2, the pair of guide plates 140 of each of the guide rows consists of a first guide plate 141 provided at one end of the guide row, and a second guide plate 142 at the other end of the guide row, these two guide plates being in opposed relation to each other and spaced from each other in the widthwise direction of the chain. It does not matter which of the guide plates 140 is the first guide plate 141 or the second guide plate 142; when one of the pair of guide plates 140 is the first guide plate 141, the other is the second guide plate 142. Each of the first and second guide plates 141 and 142 of each of the guide rows G is either a contact guide plate P1 (indicated by dark hatching in FIG. 1) or a non-contact guide plate P0 (indicated by light hatching in FIG. 1).

Figure 3:
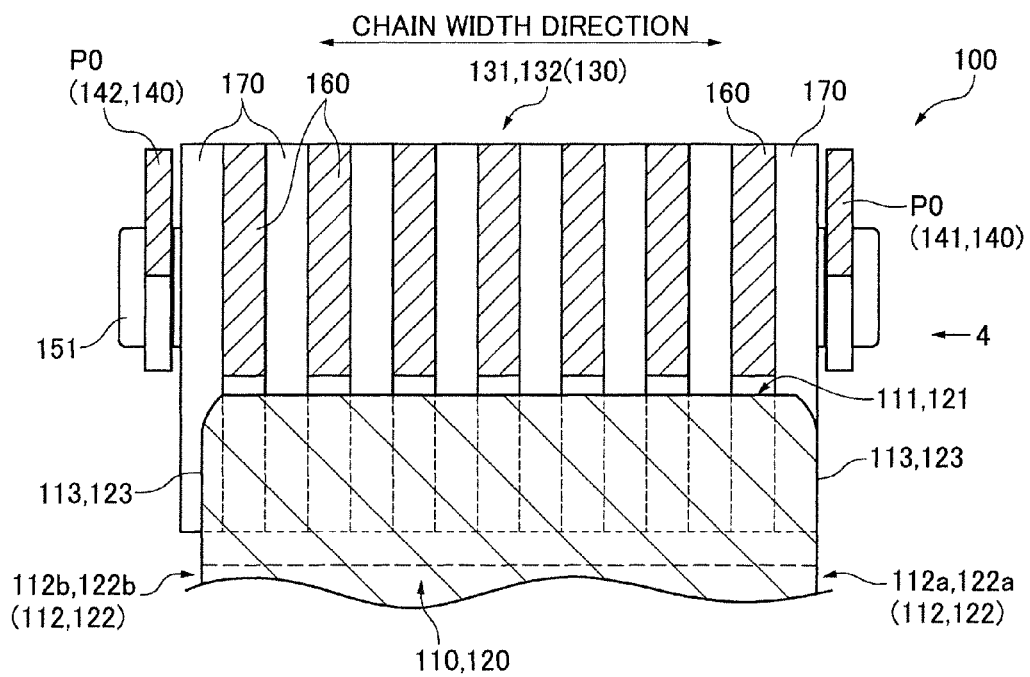
FIG. 3 is a cross sectional view of the chain transmission of FIG. 1, taken on section plane 3a-3a or section plane 3b-3b in FIG. 1.

A contact guide plate P1 is able to come into contact with a side surface of sprocket 110 and with a corresponding side surface of sprocket 120. Depending on a running condition of the chain 130, a contact guide plate P1 may or may not come into contact with a side surface 112 or 122 of a sprocket. When restricting sideslip of the chain, which includes the prevention of meandering of the chain, a guide plate P1 comes into contact with a sprocket side surface, e.g., side surface 112a or 122a of the respective sprockets or with a sprocket side surface 112b or 122b, depending on the direction of the chain sideslip (FIG. 3). The sprocket side surfaces 112 and 122 include at least side surfaces 113 and 123 of the sprocket teeth 111 and 112, respectively.

A non-contact guide plate P0 does not come into contact with the sprocket side surfaces 112 and 122 while the chain 130 is running, and is smaller and lighter than a contact guide plate P1.

In order to avoid coming into contact with the sprocket side surfaces 112 and 122, the non-contact guide plate P0 has a shape such that no part thereof can overlap a sprocket tooth. In the embodiment shown, in the wrapped portions 131 and 132 of the chain, the entire non-contact guide plate is positioned radially outward of the sprocket teeth 111 and 121. This configuration reduces the weight of the non-contact guide plate P0. This configuration also prevents the non-contact guide plate P0 from coming into contact not only with the sprocket side surfaces 112 and 122, but also with the sprocket teeth 111 and 121 in the direction of the radius of a sprocket. Although the entire plate P0 is positioned radially outward of the sprocket teeth in the embodiment shown, it is possible for portions of a non-contact guide plate that come into register with the spaces between sprocket teeth to extend radially inward relative to the tips of the sprocket teeth.

Referring to FIG. 1, all of the guide rows G of the chain 130 are categorized as either a contact guide row G1, in each of which at least one of the first and second guide plates 141 and 142 is a contact guide plate P1, or as a anon-contact guide row G0, in each of which both the first and second guide plates 141 and 142 are non-contact guide plates P0.

The chain 130 includes one or more non-contact guide rows G0. In the embodiments shown, the number of non-contact guide rows G0 exceeds the number of contact guide rows G1. The weight of the chain is reduced when the number of non-contact guide rows is increased.

One or more non-contact guide rows G0 are arranged between successive contact guide rows G1. In the embodiment shown in FIG. 1 four non-contact guide rows are arranged between successive contact guide rows. The number of non-contact guide rows between successive contact guide rows in the chain can be a constant predetermined number, e.g., two or more, in which case the contact guide rows G1 are arranged at regular intervals along the longitudinal direction of the chain.

In the embodiment shown in FIG. 1, all of the contact guide rows G1 are first contact guide rows G11 in which each of the first and second guide plates 141 and 142 (FIG. 2) is a contact guide plate P1.

As is apparent from FIG. 1, each of the wrapping portions 131 and 132 always includes at least one first contact guide row in the embodiment of FIG. 1, each of the wrapping portions includes a plurality of first contact guide rows G11 and a larger number of non-contact guide rows G0.

The weight of the chain is reduced with an increasing number of non-contact guide rows G0 in the wrapping portions 131 and 132. However, a minimum number of the contact guide rows G1 in the wrapping portions is required to restrict sideslip of the chain. In the wrapping portions 131 and 132, the number of non-contact guide rows G0 can be more than twice as many as the number of contact guide rows G1.

Each of the guide plates 140 of each of the guide rows G is either a contact guide plate P1 or a non-contact guide plate P0. Each of the guide rows G of the chain 130 may be categorized as a contact guide row G1, having at least one contact guide plate P1, or a non-contact guide row G0, having only non-contact guide plates P0.

It is possible to restrict sideslip of the chain by utilizing a contact guide row G1 having a contact guide plate P1. Because some of the guide rows G are non-contact guide rows G0, both guide plates 140 of which are non-contact guide plates, the number of the guide rows G that come into contact with the sprocket side surfaces 112 and 122 is decreased, and noise and friction caused by the contact between the guide plates 140 and the side surfaces 112 and 122 of the sprockets are reduced. Reduction of friction reduces power loss and improves transmission efficiency. Because the non-contact guide plates P0 can be made lighter than the contact guide plates P1, the wrapping portions 131 and 132 of the chain 130 become lighter. Thus, it is possible to decrease impact and friction generated when the contact guide plates P1 come into contact with the sprocket side surfaces 112 and 122, and to reduce noise and frictional loss. Furthermore, the weight of the chain 130 as a whole is decreased, which contributes to reduction of the overall weight of the machine in which the chain transmission 100 is incorporated.

Each of the wrapping portions 131 and 132 always includes a plurality of contact guide rows G1 and a plurality of non-contact guide rows G0. Because the wrapping portions 131 and 132 always include a plurality of contact guide rows G1, it is possible to restrict sideslip of the chain by contact between the guide plates P1 of the contact guide rows G1 and sprocket side surfaces 112 and 122.

Because the wrapping portions 131 and 132 always include a plurality of non-contact guide rows G0, the weight of the wrapping portions 131 and 132 is decreased, and impact noise and friction generated when contact guide plates P1 come into contact with the sprocket side surfaces 112 and 122 are also reduced.

If a guide row G1 is a first contact guide row G11 having a pair of contact guide plates P1, it is possible in each of the wrapping portions 131 and 132 to restrict chain sideslip bidirectionally in the widthwise direction of the chain. If each of the wrapping portions 131 and 132 includes a plurality of first contact guide rows G11, the bidirectional restriction of the chain against sideslip is enhanced.

If each of the wrapping portions 131 and 132 always includes a larger number of non-contact guide rows G0 than contact guide rows G1, the weight of the wrapping portions 131 and 132 is further decreased. Thus, it is possible to decrease impact noise and friction generated when the contact guide plates P1 come into contact with the sprocket side surfaces 112 and 122.

In the following description of second to fourth embodiments, the same reference numerals as the first embodiment are basically used for members are used to designate components that correspond to components of the embodiment described above.

In the chain transmission 100 of a second embodiment, the chain 230 includes contact guide rows G1, which can be first contact guide row G11, or second contact guide row G12, one of the first and second guide plates 141 and 142 of which is a contact guide plate P1, and the other of the first and second guide plates of which is a non-contact guide plate P0. The chain 230 includes one or more first contact guide rows G11 and one or more second contact guide rows G121. In the embodiment shown, the chain includes one first contact guide row G11, and a plurality of second contact guide rows G121.

Each of the second contact guide rows G121 in the chain 230 is either a type 1 contact guide row G121, the first and second contact guide plates 141 and 142 of which are respectively a contact guide plate P1 and a non-contact guide plate P0, or a type 2 contact guide row G122 whose first and second guide plates 141 and 142 are respectively a non-contact guide plate P0 and a contact guide plate P1.

Specifically, the chain 230 includes one or more type 1 contact guide rows G121 and one or more type 2 contact guide rows G122. In the embodiment shown, the chain includes a plurality of type 1 contact guide rows G121 and a plurality of type 2 contact guide rows G122.

One or more (one in the embodiment shown in FIG. 5) first contact guide rows G11 or type 1 contact guide rows G121 are arranged between two successive type 2 contact guide rows G122 in the longitudinal direction of the chain. The number of guide rows G arranged between a first contact guide row G11 and a succeeding type 2 contact guide row G122, and between two successive type 2 contact guide rows G122 is constant.

Figure 5:
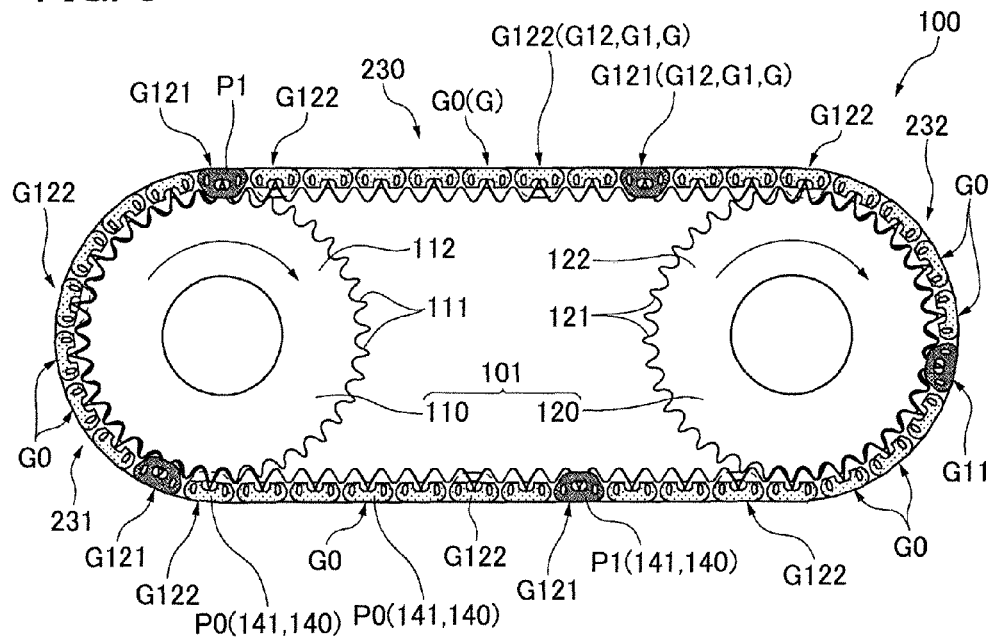
FIG. 5 is an elevational view illustrating a chain transmission device in accordance with a second embodiment of the invention.
Figure 6:
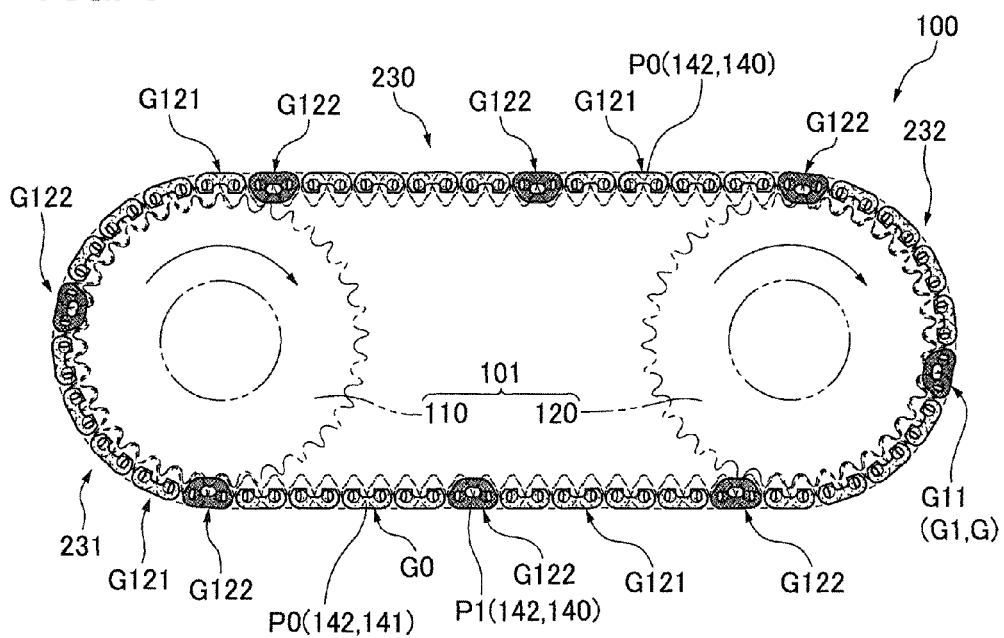
FIG. 6 is a cross-sectional view of the second embodiment shown in FIG. 5, taken on section plane 6-6 in FIG. 2.

As is apparent from FIGS. 5 and 6, each of the wrapping portions 231 and 232 always includes one or more (one in the present embodiment) first contact guide rows G11 and one or more second contact guide rows G122, or one or more type 1 contact guide rows G121 and one or more type 2 contact guide rows G122.

Each of the wrapping portions 231 and 232 always includes a larger number of non-contact guide rows G0 than contact guide rows G1.

In this second embodiment, the contact guide rows G1 included in the chain 230 consist of one first contact guide row G11 and a plurality of second contact guide rows G12. The plurality of the second contact guide rows G12 consists of a plurality of the type 1 contact guide rows G121 and a plurality of the type 2 contact guide rows G122. Each of the wrapping portions 231 and 232 always includes one first contact guide row G11 and a plurality of second contact guide rows G12, or one or more of the type 1 contact guide rows G121 and one or more of the type 2 contact guide rows G122.

With this configuration, because each of the wrapping portions 231 and 232 always includes at least one first guide plate 141, which is a contact guide plate P1, and at least one second guide plate 142, which is a contact guide plate P1, it is possible to restrict the chain sideslip bidirectionally in the widthwise direction of the chain.

Because each of the wrapping portions 231 and 232 always includes a second contact guide row G12, one of the pair of guide plates 140 of which is a contact guide plate P1 and the other of which is a non-contact guide plate P0, it is possible not only to restrict sideslip, but also to reduce the weight of the wrapping portions 231 and 232. Thus, it is possible to decrease impact noise and friction generated when the contact guide plate P1 comes into contact with the sprocket side surfaces 121 and 122.

Figure 7:
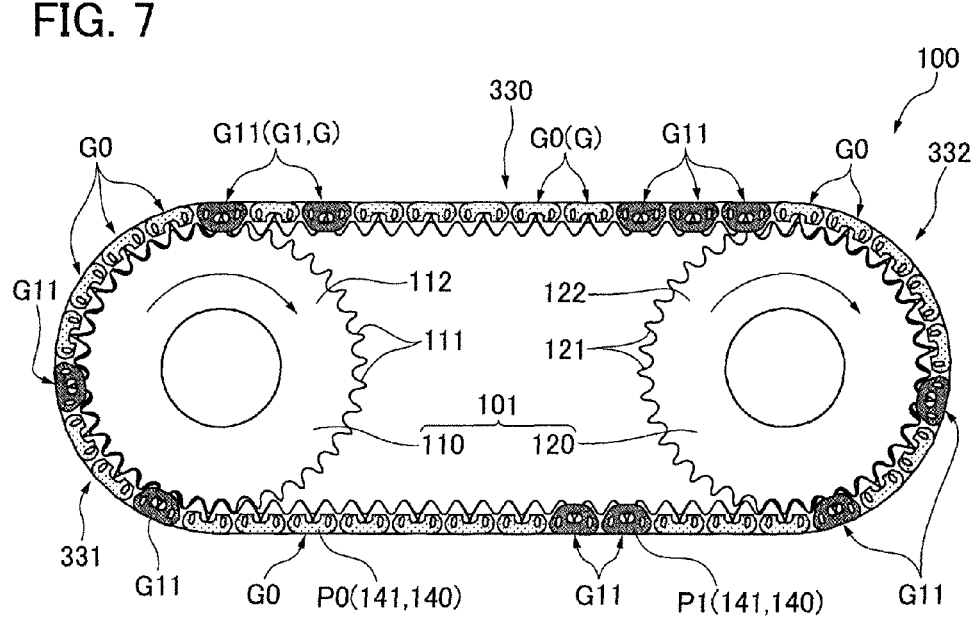
FIG. 7 is an elevational view illustrating a chain transmission device in accordance with a third embodiment of the invention.
Figure 8:
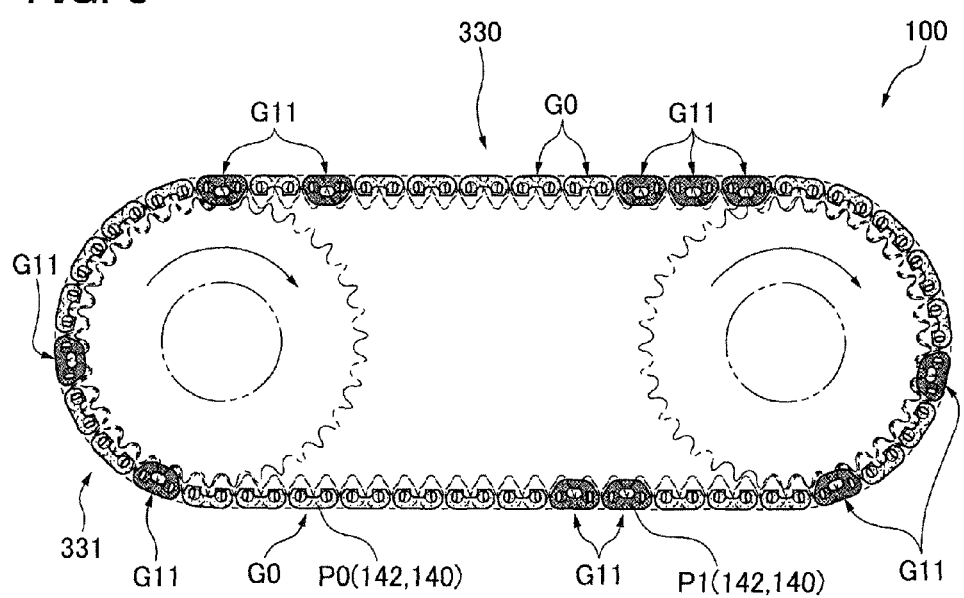
FIG. 8 is a sectional view, corresponding to FIG. 6, illustrating the third embodiment shown in FIG. 7.

In a third embodiment, shown in FIGS. 7 and 8, the chain transmission 100 includes a chain 330. All of the contact guide rows G1 in the chain 330 are first contact guide rows G11. The number of non-contact guide rows G0 arranged between two successive first contact guide rows G11 differs depending on the positions of the first contact guide rows G11 in the longitudinal direction of the chain. Thus, the first contact guide rows G11 in the chain 330 are arranged randomly in the longitudinal direction of the chain, i.e., at two or more different intervals.

Each of wrapping portions 331 and 332 always includes one or more (a plurality in the present embodiment) first contact guide rows G11, and a plurality of the non-contact guide rows G0 the number of which exceeds the number of guide rows G11.

The contact guide rows G11 of the chain 330 constitute one or more consecutive guide row sets and one or more single contact guide rows. The consecutive guide row set includes a plurality of first contact guide rows G11 that are consecutive except for the link row L connecting successive guide rows. The single contact guide row includes one first contact guide row G11.

Each of the wrapping portions 331 and 332 always includes a plurality of first contact guide rows G11, and each of the wrapping portions 331 and 332 always includes the first and second guide plates 141 and 142, both of which are contact guide plates P1. Thus, it is possible to restrict sideslip of the chain bidirectionally in the widthwise direction, and to increase the restriction of sideslip compared to the case in which some of the guide rows G1 in the wrapping portions 331 and 332 are second contact guide row G12.

Because the first contact guide rows G11 are arranged randomly in the chain longitudinal direction, the guide plates 140 do not come into contact with the sprocket side surfaces 112 and 122 at regular intervals when the chain 330 engages with the sprockets. Thus, periodic noise is decreased.

Figure 9:
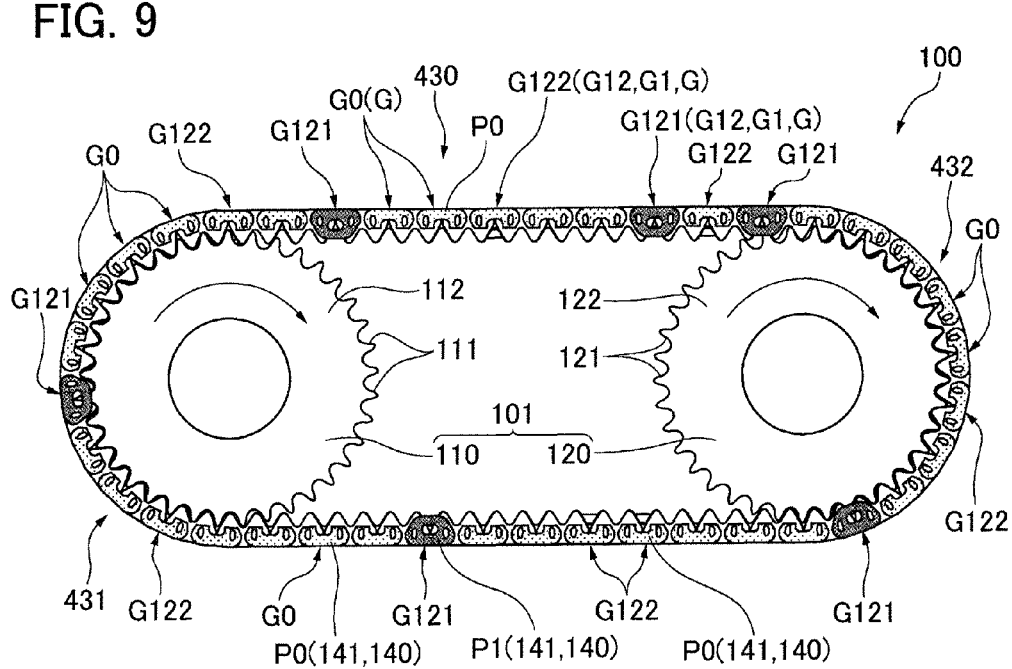
FIG. 9 is an elevational view illustrating a chain transmission device in accordance with a fourth embodiment of the invention.
Figure 10:
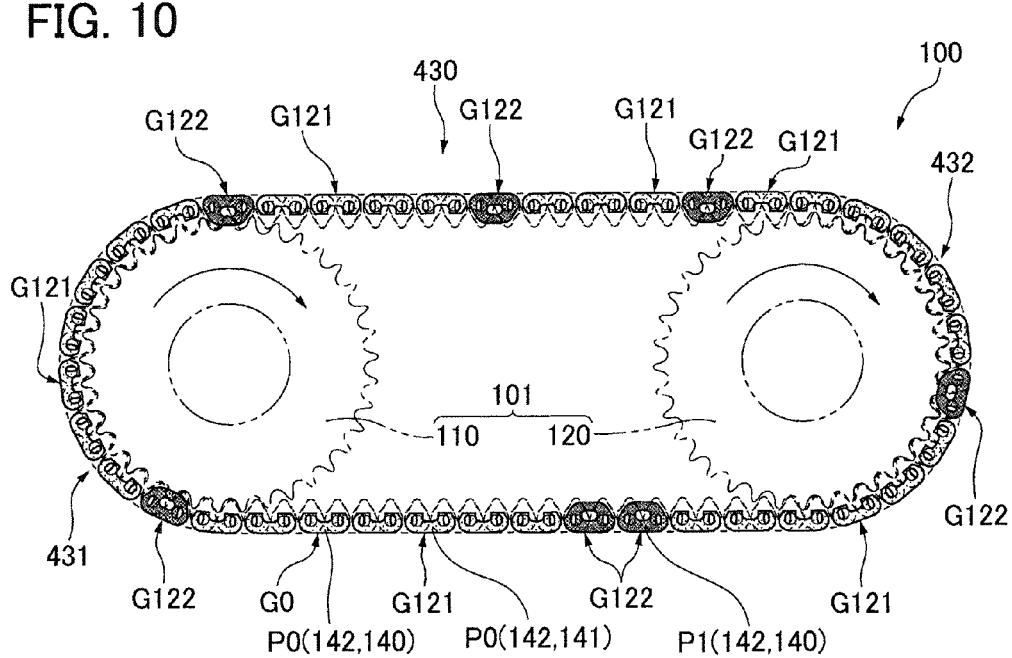
FIG. 10 is a sectional view, corresponding to FIG. 6, illustrating the fourth embodiment shown in FIG. 9.
Figure 11:
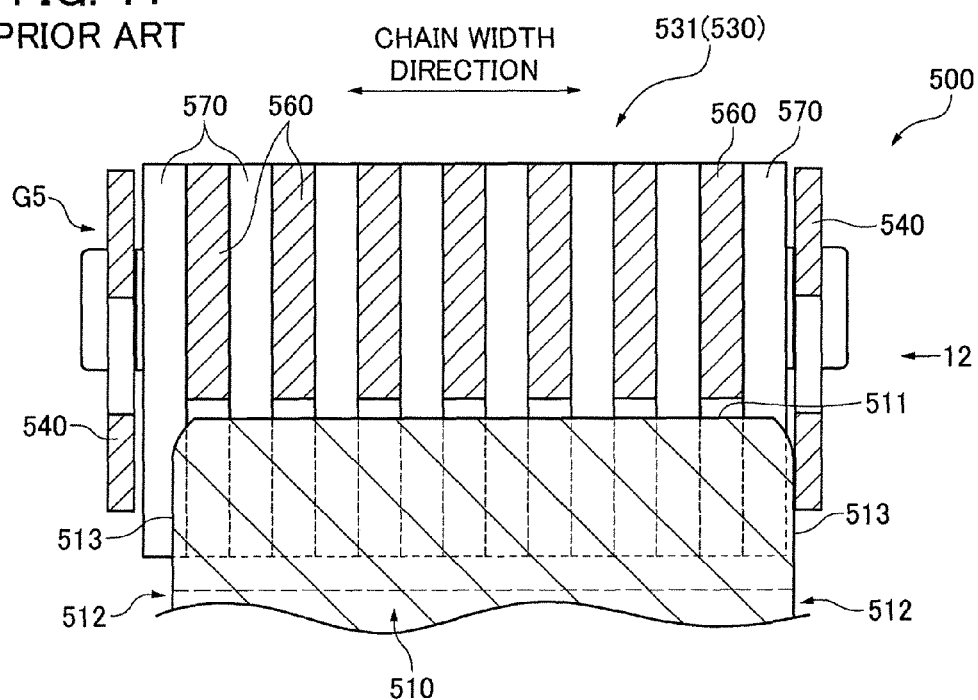
FIG. 11 is a view, corresponding to FIG. 2, illustrating a part of a chain transmission of the prior art.
Figure 12:
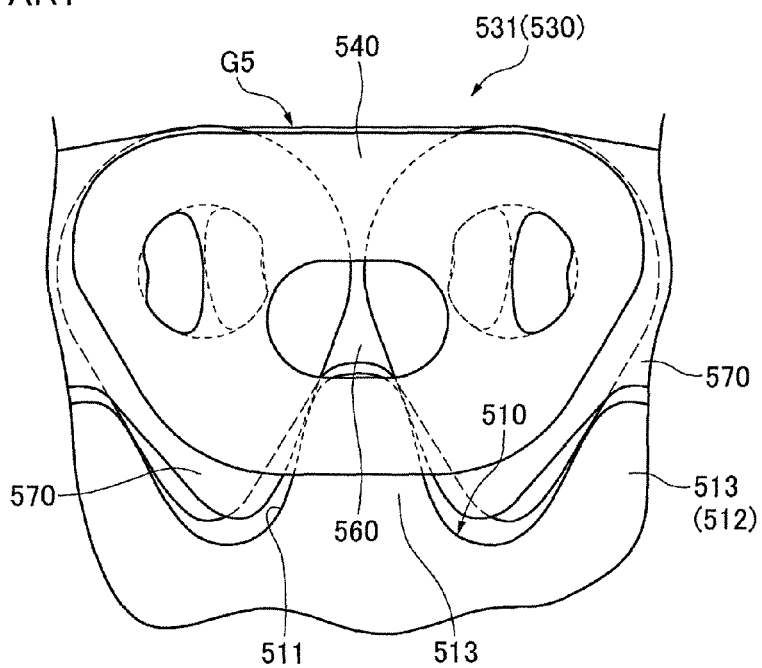
FIG. 12 is an elevational view of a part of the chain of FIG. 11, as viewed in the direction of arrow 12 in FIG. 11.

The chain transmission 100 of the fourth embodiment, shown in FIGS. 9 and 10, includes a chain 430. All of the contact guide rows G1 in the chain 430 are second contact guide rows G12, or more specifically, type 1 contact guide rows G121 and type 2 contact guide rows G122. The arrangement of the non-contact guide rows G0 with reference to the contact guide rows G1 is the same as that of the third embodiment. Each of the wrapping portions 431 and 432 of the chain 430 always includes one or more type 1 contact guide rows G121, one or more type 2 contact guide row G122, and a plurality of non-contact guide rows G0 the number of which is greater than the number of contact guide rows G1 included therein.

If the guide rows G1 are arranged randomly, the same effects as the first and third embodiments can be achieved. In addition, the following effects can be achieved.

Because each of the wrapping portions 431 and 432 always includes one or more type 1 contact guide rows G121 and one or more type 2 contact guide rows, it is possible to restrict sideslip bidirectionally in the widthwise direction of the chain.

Because the contact guide row G1 included in each of the wrapping portions 431 and 432 is always a second contact guide row G12, the weight of each of the wrapping portions 431 and 432 is reduced. Thus, it is possible to decrease impact noise and friction.

Many variations of the above described embodiments are possible. For example, the non-contact guide plate P0 may have a shape such that a part is positioned radially inward of the radius of the tips of the sprocket teeth, as long as the non-contact guide plate P0 does not come into contact with the sprocket teeth 111 and 121, including the side surfaces 113 and 123 thereof.

As variations of the first embodiment, all of the guide rows G1 of the chain 130 may consist of other combinations of first guide rows G11 and second guide rows G12. In other words, all of the guide rows G1 of the chain 130 may consist of or more first contact guide rows G11, one or more type 1 contact guide rows G121 and one or more type 2 contact guide rows G122, one or more first contact guide rows G11 and one or more type 1 contact guide rows G121, or one or more first contact guide rows G11 and one or more type 2 contact guide rows G122.

Alternatively, all of the guide rows G1 of the chain 130 may consist of only second contact guide rows G12. In other words, all of the guide rows G1 of the chain 130 may consist of one or more type 1 contact guide rows G121 and one or more type 2 contact guide rows G122, only the type 1 contact guide rows G121 or only the type 2 contact guide rows G122.

Similarly, in the second, third and fourth embodiments, all of the guide rows G1 of the chains 230, 330 and 430 may consist of any of the combinations of the first contact guide row G11 and the second contact guide row G12, or only the second contact guide rows G12, described in the above variations of the first embodiment. In any of the variations, a plurality of the contact guide rows G1 may be arranged either at regular intervals or randomly along the longitudinal direction of the chain.

In each of the embodiments, it is sufficient that all, or at least one, of the wrapping portions, always include one or more first contact guide rows G11, one or more first contact guide rows G11 and one or more second contact guide rows G12, or one or more type 1 contact guide rows G121 and one or more type 2 contact guide rows G122.

In the second embodiment, the first contact guide row G11 and the type 2 contact guide row G121 may exist between two type 2 contact guide rows 122 mutually adjacent in the longitudinal direction of the chain.

What is claimed is:

1. A chain transmission comprising:
   a chain elongated in a lengthwise direction and having a width in a widthwise direction perpendicular to the lengthwise direction, the chain comprising a plurality of guide rows and a plurality of link rows, said guide rows and link rows being arranged alternately along the lengthwise direction of the chain and flexibly interconnected to one another, each of the guide rows having a pair of guide plates spaced from each other in the widthwise direction and at least one first link plate disposed between the pair of guide plates, and each of the link rows having a plurality of second link plates; and
   a plurality of sprockets at least one of said sprockets being in driving relationship with the chain and at least one of the sprockets being in driven relationship with the chain, the chain having a plurality of wrapping portions, a wrapping portion being in engagement with, and extending around, a portion of each of the sprockets;
   wherein each of the guide plates of each of the guide rows is a guide plate from the group consisting of contact guide plates, which are able to come into contact with side surfaces of the sprockets when in a wrapping portion of the chain, and non-contact guide plates, which do not come into contact with either the side surfaces or the teeth of the sprockets when in the wrapping portion of the chain, and
   wherein the guide rows of the chain include at least one contact guide row having at least one contact guide plate, and at least one non-contact guide row having only non-contact guide plates.

2. The chain transmission according to claim 1, wherein one of the pair of guide plates of at least one of the contact guide rows is a contact guide plate and the other of the pair is a non-contact guide plate.

3. The chain transmission according to claim 1, wherein a plurality of the contact guide rows are arranged randomly in the lengthwise direction of the chain.

4. The chain transmission according to claim 1, wherein each of guide plates of each contact guide row is a contact guide plate.

5. The chain transmission according to claim 1, wherein at least one of the wrapping portions of the chain always includes at least one contact guide row having at least one contact guide plate and a plurality of non-contact guide rows each having only non-contact guide plates.

6. The chain transmission according to claim 5, wherein each of guide plates of each contact guide row is a contact guide plate.

7. The chain transmission according to claim 5, wherein:
   the pair of guide plates of each of said guide rows consists of a first and second guide plates opposed to each other in the widthwise direction and provided on opposite sides of the chain;
   the contact guide rows of the chain comprise at least one first contact guide row, the first and second guide plates of which are contact guide plates, and a plurality of second contact guide rows one of the first and second guide plates of which is a contact guide plate and the other of the first and second guide plates of which is a non-contact guide plate;
   the plurality of second contact guide rows consists of guide rows from the group consisting of type 1 contact guide rows the first and second guide plates of which are respectively contact guide plates and non-contact guide plates and type 2 contact guide rows the first and second guide plates of which are respectively non-contact guide plate and contact guide plates; and at least one of said wrapping portions always includes at least one guide row from the group consisting of: (a) at least one first contact guide row; (b) at least one first contact guide rows and at least one second contact guide row; and (c) at least one said type 1 contact guide row and at least one said type 2 contact guide rows.

8. The chain transmission according to claim 7, wherein each of guide plates of each contact guide row is a contact guide plate.

9. The chain transmission according to claim 5, wherein:
the pair of guide plates of each of said guide rows consists of a first and second guide plates opposed to each other in the widthwise direction and provided on opposite sides of the chain;
each of the contact guide rows is a guide row from the group consisting of a type 1 contact guide row the first and second guide plates of which are respectively contact guide plates and non-contact guide plates, and a type 2 contact guide row the first and second guide plates of which are respectively non-contact guide plate and contact guide plates; and
at least one of the wrapping portions always includes at least one said type 1 contact guide row and at least one said type 2 contact guide row.

10. The chain transmission according to claim 5, wherein, in each of said wrapping portions the number of said non-contact guide rows is always greater than the number of contact guide rows.

11. The chain transmission according to claim 10, wherein:
the pair of guide plates of each of said guide rows consists of a first and second guide plates opposed to each other in the widthwise direction and provided on opposite sides of the chain;

the contact guide rows of the chain comprise at least one first contact guide row, the first and second guide plates of which are contact guide plates, and a plurality of second contact guide rows one of the first and second guide plates of which is a contact guide plate and the other of the first and second guide plates of which is a non-contact guide plate;
the plurality of second contact guide rows consists of guide rows from the group consisting of type 1 contact guide rows the first and second guide plates of which are respectively contact guide plates and non-contact guide plates and type 2 contact guide rows the first and second guide plates of which are respectively non-contact guide plate and contact guide plates; and
at least one of said wrapping portions always includes guide rows from the group consisting of: at least one first contact guide row; at least one first contact guide row and at least one second contact guide row; and at least one said type 1 contact guide row and at least one said type 2 contact guide rows.

12. The chain transmission according to claim 10, wherein:
the pair of guide plates of each of said guide rows consists of a first and second guide plates opposed to each other in the widthwise direction and provided on opposite sides of the chain;
each of the contact guide rows is a guide row from the group consisting of a type 1 contact guide row the first and second guide plates of which are respectively contact guide plates and non-contact guide plates, and a type 2 contact guide row the first and second guide plates of which are respectively non-contact guide plate and contact guide plates; and
at least one of the wrapping portions always includes at least one said type 1 contact guide row and at least one said type 2 contact guide row.

* * * * *